(12) United States Patent
Regal

(10) Patent No.: US 6,289,408 B1
(45) Date of Patent: Sep. 11, 2001

(54) BUS INTERFACE WITH ADDRESS MASK REGISTER FOR TRANSFERRING SELECTED DATA FROM ONE BUS TO ANOTHER

(75) Inventor: Michael L. Regal, Campbell, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 08/437,463

(22) Filed: May 8, 1995

(51) Int. Cl.[7] .................................................... G06F 12/00
(52) U.S. Cl. ............................................. 710/126; 710/100
(58) Field of Search .................................. 395/166, 279, 395/281, 421.01, 288, 287, 308; 710/100, 126

(56) References Cited

U.S. PATENT DOCUMENTS

| | | | | |
|---|---|---|---|---|
| 4,853,846 | * | 8/1989 | Johnson et al. | 395/281 |
| 5,088,028 | * | 2/1992 | Theus et al. | 395/288 |
| 5,287,452 | * | 2/1994 | Newman | 395/166 |
| 5,513,337 | * | 4/1996 | Gillespie et al. | 395/479 |

* cited by examiner

Primary Examiner—Kevin Verbrugge
(74) Attorney, Agent, or Firm—Burns, Doane, Swecker & Mathis, L.L.P.

(57) ABSTRACT

A method and system for selectively permitting address values to pass between two buses. Portions of the address values are used to select data in a mask register. The determination of whether to pass the address value is made on the basis of the mask register value ultimately selected.

11 Claims, 1 Drawing Sheet

BUS INTERFACE WITH ADDRESS MASK REGISTER FOR TRANSFERRING SELECTED DATA FROM ONE BUS TO ANOTHER

FIELD OF THE INVENTION

The present invention relates to an address mask register which is used as a look-up to determine whether an address currently on an address bus should be acted upon.

BACKGROUND OF THE INVENTION

Components in computer systems generally communicate over a bus. While at one time systems had only one bus, multiple bus architectures operating within multiple processor system environments have become more common. As a result, bus interfaces or bridges are needed between two buses to facilitate the transfer of data from one bus to another.

In some programming applications, it is desired that the bus interface only pass certain addresses on to target devices and ignore other addresses. Some systems for accomplishing this result can be unduly complex. It would thus be advantageous to have a simple and easily implemented system for providing an indication as to which addresses should be passed on to targets.

SUMMARY OF THE INVENTION

It is an object of the present invention to provide a mask register which is used as a look-up means for determining whether an address currently on the address bus should be sent to a target device, or whether the address currently on the bus should be ignored.

According to one embodiment of the present invention, an address mask register for defining a range of addresses to which a bus interface will respond is disclosed. The address mask register has two fields: a coarse address select field and a fine address select field. The coarse address select field defines which coarse regions of memory are transferred from a first bus to a second bus by the bus interface. The fine address select field defines which fine regions of memory are transferred from the first bus to the second bus by the bus interface.

According to another embodiment of the present invention, a method for determining whether a bus interface should pass information from a first bus to a second bus based upon the address associated with the information is disclosed. First, each target device on the first and second buses is assigned a different memory address. The assigned memory addresses are then stored in said bus interface in an address mask register. When a request is received at said bus interface to transfer information from said first bus to a target device on the second bus, the address associated with the information is compared with the addresses set in the mask register. The information is transferred from the first bus to the target device on the second bus when the address associated with the information is stored in the address mask register.

BRIEF DESCRIPTION OF THE DRAWINGS

These and other features and advantages of the present invention will be readily apparent to one of ordinary skill in the art from the following written description, used in conjunction with the drawings, in which.

DETAILED DESCRIPTION

The present invention involves the use of an interface between two asynchronous buses. The present invention will be described with reference to an arrangement in which one of the buses is a peripheral component interconnect (PCI) bus and the other bus is an Apple RISC bus (ARBus). However, it will be understood by one of ordinary skill in the art that the present invention applies to a variety of systems incorporating other buses and is not limited to structures which include a PCI bus and an ARBus.

At boot up, a processor initializes the computer system and assigns each target a certain address space. The processor also informs a bus interface 10 which targets have assigned address spaces by programming an address mask register which will be explained below.

Figure 1:
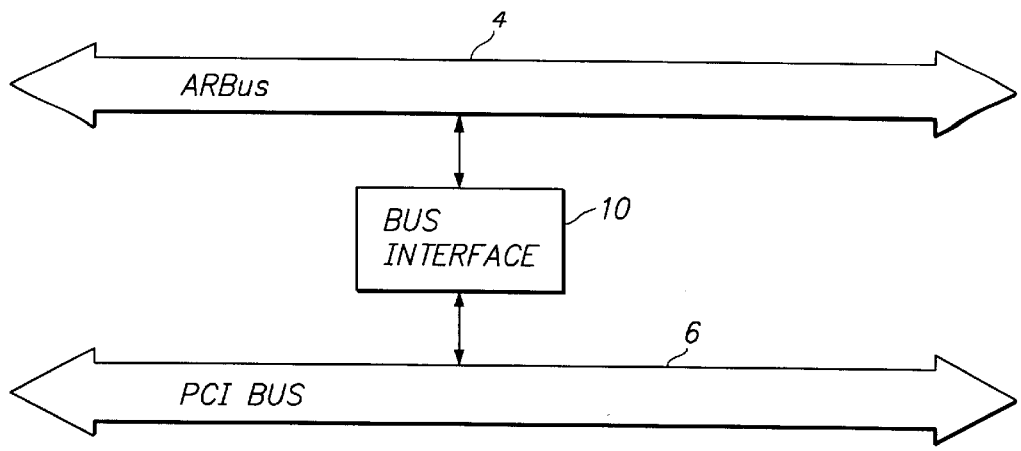
FIG. 1 illustrates a bus interface according to one embodiment of the present invention.
Figure 2:
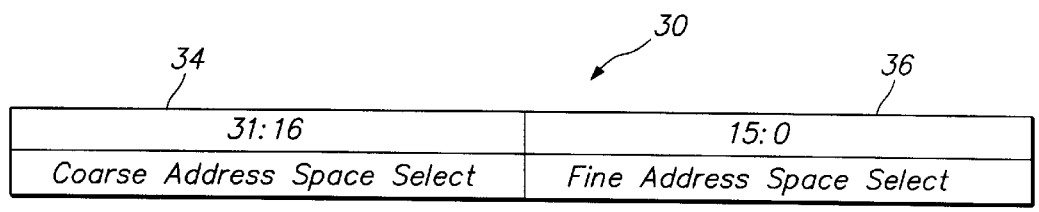
FIG. 2 illustrates an organization of information in an address mask register according to one embodiment of the present invention.

As will be explained in more detail below and as shown in FIG. 1, the bus interface 10 determines whether to transfer information between the first bus 4 (taken as the ARBus in the example) and the second bus 6 (taken as a PCI bus) by comparing the address associated with the information with the contents of an address mask register. The bus interface 10 passes the ARBus address on to the PCI bus address with appropriate modification. The range of addresses responded to by the bus interface 10 from the ARBus is defined by the bus interface address mask register 30, the organization of which is shown in FIG. 2. As illustrated in FIG. 2, the address mask register 30 is divided into two sections, a coarse address select field 34 occupying bits 31 to 16, and a fine address select field 36 occupying bits 15 to 0, to define sixteen coarse (256 MByte) and sixteen fine (16 MByte) regions of the 32 bit address space.

The coarse address select field 34 defines which coarse or 256 MByte regions of memory should be passed from the ARBus to the PCI bus. If a given bit in the 16-bit coarse select address field 34 is set, addresses on the ARBus with matching bits at positions [0:3] are passed from the ARBus to the PCI Bus while the same address values on the PCI Bus , [31:28], are not passed to the ARBus. If a given bit in this field is not set, addresses on the ARBus with the matching bits [0:3] are not passed from the ARBus to the PCI Bus while the same address values on the PCI Bus [31:28] are passed to the ARBus.

The address mask register 30 also defines 16 fine regions or 16 MByte regions broken down within one "coarse" region which should be passed from the ARBus to the PCI bus. The fine address select field 36 defines which fine or 16 MByte regions of memory should be passed from the ARBus to the PCI bus when ARBus address [0:3] =0×F. If a given bit in the 16-bit fine select address field 36 is set, addresses on the ARBus with matching bits at positions [4:7] are passed from the ARBus to the PCI Bus while the same address values on the PCI Bus are not passed to the ARBus. If a given bit in this field is not set, addresses on the ARBus with the matching bits [4:7] are not passed from the ARBus to the PCI Bus while the same address values on the PCI Bus [27:24] are passed to the ARBus.

According to this embodiment of the present invention, the bus interface implements a simple decode/anti-decode scheme, whereby if a given address is decoded to be passed from the ARBus to the PCI bus, the same address is not allowed to pass from the PCI bus to the ARBus.

Figure 3:
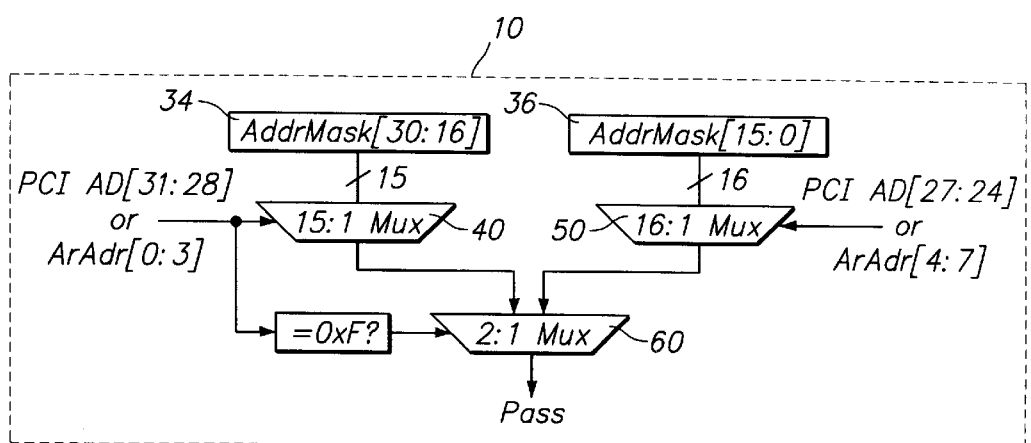
FIG. 3 illustrates a bus interface address decoding scheme according to one embodiment of the present invention.

FIG. 3 illustrates an arrangement according to one embodiment of the present invention for effecting this decoding scheme. Fifteen bits of the coarse select address field 34 are passed to a 15:1 multiplexer 40. (Bit 31 of the coarse address select field 34 is disregarded because its position, representing coarse space $F, is always used to decode into the fine address select field.) The output of the multiplexer 40 is selected on the basis of the values at positions [31:28] of a PCI address or [0:3] of the ARBus address.

Similarly, sixteen bits of the fine address select field 36 are passed to a 16:1 multiplexer 50. The output of the multiplexer 50 is selected on the basis of the values at positions [27:24] of a PCI address or [4:7] of the ARBus address.

The selected outputs of the multiplexers 40 and 50 are supplied as inputs to a 2:1 multiplexer 60, which selects one of the inputs on the basis of whether the values at positions [31:28] of a PCI address or [0:3] of an ARBus address equals 0×F. The output of the multiplexer 60 determines whether the address should pass between the buses.

It will appreciated by those of ordinary skill in the art that the present invention can be embodied in other specific forms without departing from the spirit or essential character thereof. The presently disclosed embodiments are therefore considered in all respects to illustrative and not restrictive. The scope of the invention as indicated by the appended claims rather than the foregoing description, and all changes which come within the meaning and range of equivalents thereof are intended to be embraced therein.

I claim:

1. An address mask register for defining a range of addresses a bus interface will respond to, said addresses being a subset of an address space divided into a plurality of coarse regions and a plurality of fine regions, said address mask resister comprising:
    a coarse address select field for defining which of said plurality of coarse regions of memory include addresses to be transferred from a first bus to a second bus by the bus interface; and
    a fine address select field for defining which of said plurality of fine regions have addresses to be transferred from the first bus to the second bus by the bus interface.

2. An address mask register according to claim 1, wherein said coarse address select field contains 16 bits and said fine address select field contains 16 bits.

3. An address mask register according to claim 1, wherein a coarse region defines a 256 MByte region of memory.

4. An address mask register according to claim 1, wherein a fine region defines a 16 MByte region of memory.

5. Apparatus for interfacing a first bus and a second bus, said interface comprising:
    a register for storing mask data; and
    a first multiplexer arranged to receive a first part of the contents of said register as respective data inputs and arranged to receive a first part of an address value from said first bus as a select input, for outputting a first value from said first part of said register selected on the basis of said first part of said address value;
    a second multiplexer arranged to receive a second part of the contents of said register as respective data inputs and arranged to receive a second part of an address value from said first bus as a select input, for outputting a second value from said second part of said register selected on the basis of said second part of said address value;
    a comparer for comparing said first part of said address with a predetermined value; and
    a third multiplexer arranged to receive said first value and said second value as respective data inputs and arranged to receive results from said comparer as a select input, for outputting one of said first value and said second value selected on the basis of said results from said comparer,
    wherein said interface determines whether to pass said address value to said second bus on the basis of the output of said third multiplexer.

6. A method of using a bus interface to control transfer of address values between a first system bus and a second system bus, the method comprising the steps of:
    a step performed by a system processor of programming an address mask register in said bus interface with data indicating
        a first set of addresses for which said bus interface will pass address values from said first system bus to said second system bus but not from said second system bus to said first system bus and
        a second set of addresses different from said first set of addresses for which said bus interface will pass address values from said second system bus to said first system bus but not from said first system bus to said second system bus;
    a step performed by said bus interface of receiving a transfer request with an associated address from one of said first system bus and said second system bus to transfer data from one bus to the other;
    a step performed by said bus interface of comparing said address associated with said request with said data programmed into said address mask register to determine if said address is in said first set of addresses or said second set of addresses; and
    a step performed by said bus interface of
        transferring said address from said first system bus to said second system bus only if the request was received from said first system bus to transfer to said second system bus and said comparing step determines that said address is in said first set of addresses,
        or, alternatively,
        transferring said address from said second system bus to said first system bus only if the request was received from said second system bus to transfer to said first system bus and said comparing step determines that said address is in said second set of addresses.

7. A computer system comprising:
    a first system bus;
    a second system bus; and
    a bus interface connected between said first system bus and said second system bus for controlling transfer of address values between said first system bus and said second system bus, said bus interface including
        an address mask register programmed with data indicating a first set of addresses for which said bus interface will pass address values from said first system bus to said second system bus but not from said second system bus to said first system bus and a second set of addresses different from said first set of addresses for which said bus interface will pass address values from said second system bus to said first system bus but not from said first system bus to said second system bus and a comparer which compares an address associated with a transfer request with said data programmed into said address mask register to determine if said address is in said first set of addresses or said second set of addresses, wherein said bus interface transfers said address from said first system bus to said second system bus only if the request was received from said first system bus to transfer to said second system bus and said comparer determines that said address is in said first set of addresses, or, alternatively, transfers said address from said second system bus to said first system bus only if the request was received from said second system bus to transfer to said first system bus and said comparer determines that said address is in said second set of addresses.

8. A computer system as claimed in claim 7 wherein said address mask register includes a coarse address select field which defines which of a plurality of coarse regions of memory include addresses in said first set and a fine address select field which defines which of a plurality of fine regions of memory have addresses in said first set.

9. A computer system according to claim 8, wherein said coarse address select field contains 16 bits and said fine address select field contains 16 bits.

10. An address mask register according to claim 8, wherein a coarse region defines a 256 MByte region of memory.

11. An address mask register according to claim 8, wherein a fine region defines a 16 MByte region of memory.

* * * * *

UNITED STATES PATENT AND TRADEMARK OFFICE
CERTIFICATE OF CORRECTION

PATENT NO.     : 6,289,408 B1
DATED          : September 11, 2001
INVENTOR(S)    : Michael L. Regal It is certified that error appears in the above-identified patent and that said Letters Patent is hereby corrected as shown below:

Column 3,
Line 35, after "mask" please delete "resister" and insert -- register -- in its place.

Signed and Sealed this

Twentieth Day of August, 2002

Attest:

JAMES E. ROGAN
Attesting Officer         Director of the United States Patent and Trademark Office